United States Patent
Stockinger et al.

(10) Patent No.: US 10,840,636 B2
(45) Date of Patent: Nov. 17, 2020

(54) CONTACTING SYSTEM FOR PRODUCING AN ELECTRICAL CONNECTION BETWEEN A PRIMARY DEVICE AND A SECONDARY DEVICE

(71) Applicant: easE-Link GmbH, Graz (AT)

(72) Inventors: Hermann Stockinger, Graz (AT); Manuel Leibetseder, Graz (AT)

(73) Assignee: EASE-LINK GMBH (AT)

( * ) Notice: Subject to any disclaimer, the term of this patent is extended or adjusted under 35 U.S.C. 154(b) by 248 days.

(21) Appl. No.: 16/087,677

(22) PCT Filed: Mar. 16, 2017

(86) PCT No.: PCT/AT2017/060069
§ 371 (c)(1),
(2) Date: Sep. 24, 2018

(87) PCT Pub. No.: WO2017/161394
PCT Pub. Date: Sep. 28, 2017

(65) Prior Publication Data
US 2020/0303874 A1 Sep. 24, 2020

(30) Foreign Application Priority Data
Mar. 25, 2016 (AT) .............................. A 50251/2016

(51) Int. Cl.
*H01R 13/62* (2006.01)
*H01R 13/24* (2006.01)
*H01R 13/44* (2006.01)

(52) U.S. Cl.
CPC ..... *H01R 13/6205* (2013.01); *H01R 13/2492* (2013.01); *H01R 13/44* (2013.01)

(58) Field of Classification Search
CPC .................. H01R 13/6205; H01R 13/2492
See application file for complete search history.

(56) References Cited

U.S. PATENT DOCUMENTS 5,909,100 A 6/1999 Watanabe et al.
6,307,347 B1 10/2001 Ronning
(Continued)

FOREIGN PATENT DOCUMENTS

CN 1762748 A 4/2006
CN 102427980 A 4/2012
(Continued)

OTHER PUBLICATIONS

PCT International Search Report and Written Opinion dated May 31, 2017 from corresponding Application No. PCT/AT2017/060069, 14 pages.

*Primary Examiner* — Ross N Gushi
(74) *Attorney, Agent, or Firm* — Dilworth IP, LLC

(57) ABSTRACT

A contacting system for producing an electrical connection between a primary device and a secondary device, comprising a primary transmission element with multiple primary contact surfaces; and comprising a secondary transmission element with multiple secondary contact surfaces. Furthermore, the primary transmission element has multiple primary PE contact surfaces and the secondary transmission element has at least one secondary PE contact surface. An electrical connection between the primary device and the secondary device is produced by contacting of the primary transmission element and the secondary transmission element.

18 Claims, 5 Drawing Sheets

(56) References Cited

U.S. PATENT DOCUMENTS

| | | | |
|---|---|---|---|
| 6,803,744 B1 * | 10/2004 | Sabo | H02J 7/00302 320/108 |
| 7,511,452 B2 * | 3/2009 | Bersenev | H02J 7/0044 320/106 |
| 8,307,967 B2 * | 11/2012 | Patwardhan | H01R 13/70 191/2 |
| 9,278,624 B2 | 3/2016 | Kinomura et al. | |
| 9,296,289 B2 | 3/2016 | Yamamoto et al. | |
| 9,333,866 B2 * | 5/2016 | Proebstle | B60L 53/65 |
| 9,576,409 B2 * | 2/2017 | Salmon | H04M 1/72519 |
| 10,538,172 B2 * | 1/2020 | Kauffmann | H01R 13/5202 |
| 2009/0011616 A1 | 1/2009 | Patwardhan | |
| 2012/0041630 A1 | 2/2012 | Yamamoto et al. | |
| 2014/0091764 A1 | 4/2014 | Kinomura et al. | |

FOREIGN PATENT DOCUMENTS

| | | |
|---|---|---|
| CN | 203491448 U | 3/2014 |
| CN | 203617032 | 5/2014 |
| DE | 10137526 A1 | 6/2002 |
| JP | S5898786 U | 7/1983 |
| JP | H10112354 A | 4/1998 |
| JP | 2010501158 A | 1/2010 |
| JP | 2012085472 A | 4/2012 |
| JP | 2014150642 A | 8/2014 |
| JP | 5841985 B2 | 1/2016 |
| WO | 2008/020463 A2 | 2/2008 |
| WO | 2011063959 A1 | 6/2011 |
| WO | 2012164644 A1 | 12/2012 |

* cited by examiner

Fig. 5 (Section A-A)

CONTACTING SYSTEM FOR PRODUCING AN ELECTRICAL CONNECTION BETWEEN A PRIMARY DEVICE AND A SECONDARY DEVICE

The invention relates to a contacting system for establishing an electrical connection between a primary device and a secondary device with at least two terminals electrically insulated from each other, with:

a primary transmission element which has a plurality of primary contact surfaces arranged in a structured manner, electrically insulated from each other, wherein each primary contact surface is connected to at least one terminal of the primary device via a respective switch, and with:

a secondary transmission element which has a plurality of secondary contact surfaces electrically insulated from each other, wherein each terminal of the secondary device is electrically connected to at least one secondary contact surface, wherein the primary transmission element is formed for contacting with the secondary transmission element and wherein, when primary transmission element and secondary transmission element are contacted, the secondary contact surfaces is in contact with at least a part of the primary contact surfaces, and with control means which, when primary transmission element and secondary transmission element are contacted, are designed to determine primary contact surfaces which are in contact with a secondary contact surface, and which are designed to establish an electrical connection between the individual terminals of the primary device and the individual terminals of the secondary device via the determined primary contact surfaces and the secondary contact surfaces by actuating the switches.

BACKGROUND OF THE INVENTION

Such a contacting system is known, for example, from the document U.S. Pat. No. 8,307,967 B2, wherein the secondary device is formed by a vehicle and the primary device is formed by a power supply unit. The primary transmission element is embedded in the road surface of a parking space and the secondary transmission element is fastened to an underbody of the vehicle. When the vehicle, driven by an electric motor, is parked in the parking space, a mechanism then lowers the primary transmission element onto the secondary transmission element, whereby electric current can flow in order to charge the vehicle's power supply via contact surfaces of the transmission elements.

The primary transmission element embedded in the road surface of the parking space is formed by two rows of round primary contact surfaces, electrically insulated from each other, arranged in the shape of a rectangle or grid. Control means are assigned to the primary transmission element, which means are connected, on the one hand, to each of the primary contact surfaces and, on the other hand, to a positive terminal and a negative terminal of a low-voltage power source in the range of from 12 to 24 volts. By means of the control means, each of the primary contact surfaces which are for the time being switched potential-free, can be connected to the positive terminal or to the negative terminal.

The secondary transmission element on the vehicle disclosed in U.S. Pat. No. 8,307,967 B2 has a row of square secondary contact surfaces, wherein the sizes of the contact surfaces have been selected such that no short circuits of the contact surfaces of a transmission element can result through contact surfaces of the other transmission element. After the mechanical lowering of the secondary transmission element onto the primary transmission element, the control means determine which primary and secondary contact surfaces are in electrical contact and then connect the appropriate primary contact surfaces of the primary transmission element to the positive terminal, and the appropriate secondary contact surfaces of the secondary transmission element to the negative terminal of the low-voltage source, so that the vehicle's power supply is charged.

In the case of the known contacting system, it has proved to be disadvantageous that, with the low-voltage source, the charging processes last a relatively long time which is why, in the case of a parking duration of, for example, only an hour, the vehicle's power supply is not completely charged. For safety reasons, the use of voltages lying above the low-voltage range between positive terminal and negative terminal is not feasible, as otherwise electrifications can result, or as the vehicle is not secured in accordance with the protective regulations.

SUMMARY OF THE INVENTION

The invention is based on the object of creating a contacting system in which, in the case of an energy transmission with voltages above the low-voltage range between primary device and secondary device, the required safety is nevertheless guaranteed in order to avoid electrifications.

According to the invention, the present object is achieved in that on the primary transmission element, several primary PE contact surfaces are formed, which are arranged on the primary transmission element between the primary contact surfaces in a structured manner electrically insulated from the primary contact surfaces, in that on the secondary transmission element, at least one secondary PE contact surface is formed, which is electrically insulated from the secondary contact surfaces, and in that the contacting system has positioning means, which positioning means, during contacting of the primary transmission element with the secondary transmission element, align the secondary transmission element and the primary transmission element with respect to each other, such that the at least one secondary PE contact surface is in contact with at least one primary PE contact surface.

The advantage is hereby obtained that, when primary and secondary transmission elements are contacted, the at least one secondary PE contact surface is always connected to at least one primary PE contact surface. As a result, a switch-free connection can be established between the primary device and the secondary device via the at least one secondary PE contact surface and the primary PE contact surfaces. Through the switch-free connection, before an electrical connection is established by the control means for transmitting current between the individual terminals of the primary device and the individual terminals of the secondary device, a direct electrical connection is established between the primary and the secondary device.

Preferably, either the at least one secondary PE contact surface is connected via a protective conductor of the secondary device, or the primary PE contact surface is connected via a protective conductor of the primary device to the earth potential, whereby the primary device and the secondary device are grounded when primary transmission element and secondary transmission element are contacted. This results in the advantage that, when voltages above 60V are applied to the terminals of the primary device or of the secondary device, a safe energy transmission between the primary device and the secondary device is also ensured.

In a further embodiment, a part of the terminals can also be used for information transmission between primary and secondary device.

For example, the secondary device is formed by a charging circuitry of a vehicle, in particular of a vehicle with an electric drive, and the primary device is formed by a permanently installed power supply unit. The primary transmission element is advantageously embedded in the road surface of a parking area, a garage or an intersection area, and the secondary transmission element is fitted onto an underbody of the electric vehicle to be lowered and lifted. By the term "intersection area" is meant above all the areas in front of intersections controlled by traffic lights, but also pedestrian crossings. The power supply unit, like any professionally connected device which is operated in the voltage range above 60V and transmits a high power, is grounded by means of a protective conductor, also called a PE conductor. Due to the increased voltage, the advantage is obtained that a power supply of the vehicle is more rapidly chargeable and the vehicle is more rapidly ready for use again. By means of the primary PE contact surfaces and the at least one secondary PE contact surface, when primary transmission element and secondary transmission element are contacted, the charging circuitry of the vehicle or the entire vehicle is safely connected to the earth potential, whereby the risk of electric shocks during the charging of the vehicle is reduced as a result.

Advantageously, the contacting means are formed by a magnetic coupling element, which magnetic coupling element consists of at least one first part and at least one second part, wherein the at least one first part is formed in the primary transmission element and the at least one second part is formed in the secondary transmission element. Preferably, the at least one first part of the magnetic coupling element is formed by an electromagnet or permanent magnet and the at least one second part is formed by a ferromagnetic element, an electromagnet or a permanent magnet, or the at least one first part of the magnetic coupling element is formed by a ferromagnetic element and the at least one second part is formed by an electromagnet or a permanent magnet. The advantage is hereby obtained, that the first and the second part of the magnetic coupling element can be completely invisibly integrated into the primary transmission element and the secondary transmission element and thus a visual appearance of the contacting system is not negatively impacted. The contamination of the primary and secondary transmission elements is also advantageously prevented by a smooth surface.

Advantageously, a first part of the magnetic coupling element is formed in each primary PE contact surface and, advantageously, a second part is formed in the at least one secondary PE contact surface. The second part formed in the at least one secondary PE contact surface is preferably an electromagnet and the first parts formed in the primary PE contact surfaces are preferably ferromagnetic inlays. The electromagnet is advantageously activated during the contacting of the primary and secondary transmission elements, and when primary and secondary transmission elements are in contact. The advantage is hereby obtained that a particularly reliable contacting of the primary element with the secondary element is guaranteed due to magnetic forces.

In a further preferred embodiment, the primary transmission element has a primary surface and the secondary transmission element has a secondary surface, wherein the positioning means are formed by a first spatial structure of the primary surface and a second spatial structure of the secondary surface. Preferably, the first spatial structure of the primary surface represents the negative form of the spatial structure of the secondary surface. The advantage is hereby obtained that, during contacting of the primary transmission element and of the secondary transmission element, the primary and the secondary transmission element are automatically displaced with respect to each other into the correct position, and the provision of additional active positioning means or energy-consuming positioning means may be dispensed with. The primary surface may, for example, be provided with a plurality of tapered recesses and a plurality of truncated cones protrude out of the secondary surface.

In a further advantageous embodiment, the contacting means are formed by a displacement unit, which displacement unit acts on the primary and/or the secondary transmission element and is formed for contacting the primary transmission element with the secondary transmission element, and formed by at least one sensor. The at least one sensor is formed in the secondary transmission element and/or the primary transmission element wherein, during contacting of the primary transmission element with the secondary transmission element, the at least one sensor detects a relative position between primary transmission element and secondary transmission element and wherein the displacement unit is actuated in accordance with the detected relative position such that the at least one secondary PE contact surface makes contact with at least one primary PE contact surface. By a "sensor" is meant in this context above all a camera, an optical sensor or an electromagnetic sensor. The advantage is hereby obtained that, even in the case of a greater distance of, for example, 10 to 20 centimetres between primary transmission element and secondary transmission element, the primary transmission element and the secondary transmission element may be aligned with respect to each other. The displacement unit is advantageously formed by an arm mounted in articulated manner on the vehicle and by at least one actuator wherein the at least one actuator acts on the arm. The position of the arm can be changed by means of the at least one actuator.

It should also be mentioned here that the process of contacting between primary transmission element and secondary transmission element is meant by the term "during contacting", i.e. the movement in order to bring the primary and secondary transmission elements that are spaced apart from each other, into contact.

Advantageously, the primary contact surfaces and the secondary contact surfaces and/or the primary PE contact surfaces and the at least one secondary PE contact surface have substantially the same outer shape and are polygonal or round. The advantage is hereby obtained that the manufacturing effort is reduced during the production of the contact surfaces.

Advantageously, during contacting of the primary transmission element with the secondary transmission element, the positioning means align the primary transmission element and the secondary transmission element with respect to each other, such that the at least one secondary PE contact surface covers at least one primary PE contact surface entirely, or at least with the greatest possible surface area. It is hereby ensured that a good enough connection is established between the primary device and the secondary device for protection against electrification.

The primary contact surfaces of the primary transmission element are preferably arranged opposite the secondary contact surfaces of the secondary transmission element such that, when the at least one secondary PE contact surface makes contact with at least one primary PE contact surface, each secondary contact surface covers at least one primary contact surface entirely, or at least with the greatest possible surface area. The advantage is hereby obtained that high powers can also be transmitted via the primary and secondary contact surfaces.

Advantageously, the at least one secondary PE contact surface has a ring-shape, wherein the at least one secondary PE contact surface is arranged on the secondary transmission element surrounding the secondary contact surface. The advantage is hereby obtained that, when primary and secondary transmission elements are in contact, in the case of an electrical connection being established between the individual terminals of the primary device and the individual terminals of the secondary device, and in the case of voltages being applied to the terminals of the primary device or the terminals of the secondary device, touching the live elements from outside is impossible, as all the live elements are entirely covered.

BRIEF DESCRIPTION OF THE DRAWINGS

Further advantageous embodiments of the contacting system according to the invention are subsequently explained in more detail with reference to the figures.

DETAILED DESCRIPTION OF THE INVENTION

Figure 1:
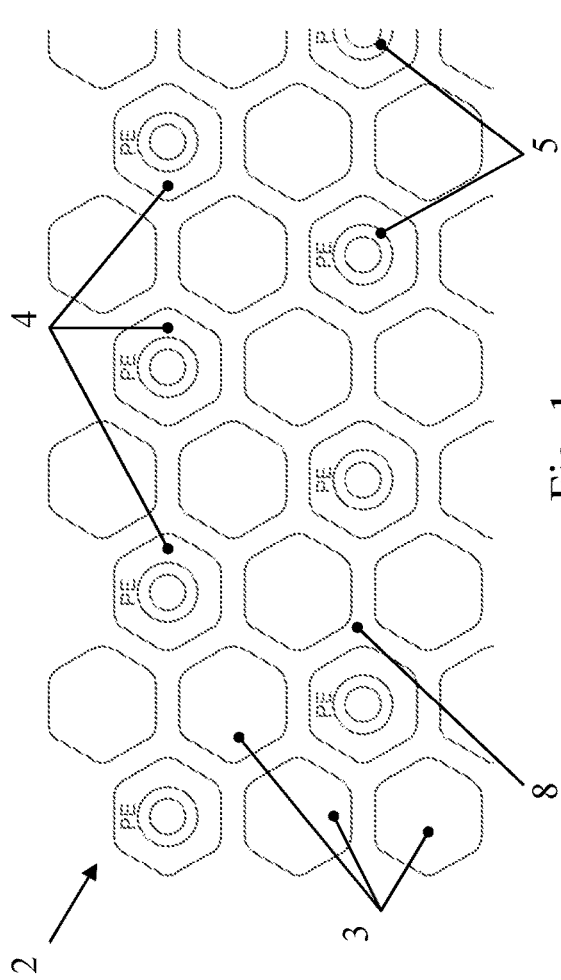
FIG. 1 shows a first embodiment of a primary transmission element in a schematic view.

FIG. 1 shows a first embodiment of a primary transmission element 2 in a schematic view. The primary transmission element 2 comprises several primary contact surfaces 3 and several primary PE contact surfaces 4. The primary contact surfaces 3 are insulated from each other and from the primary PE contact surfaces 4 and arranged in a structured manner on a primary surface of the primary transmission element, wherein the primary contact surfaces 3 and the primary PE contact surfaces 4 have the same hexagonal shape. The primary contact surfaces 3 are moulded into artificial resin 8 electrically insulated from each other and from the primary PE contact surfaces 4. It is however also possible, to use any other materials instead of artificial resin 8, for example, materials made of plastic or ceramic, which have electrically insulating properties. In the primary PE contact surfaces 4, first parts of a positioning means are formed in the form of a magnetic coupling element. The first parts are formed by ferromagnetic inlays 5, which consist of iron or of an iron alloy. The primary PE contact surfaces 4 and the primary contact surfaces 3 consist of copper, but may also be formed from aluminium, chromium, nickel, silver, gold or alloys with at least one of these metals.

Figure 2:
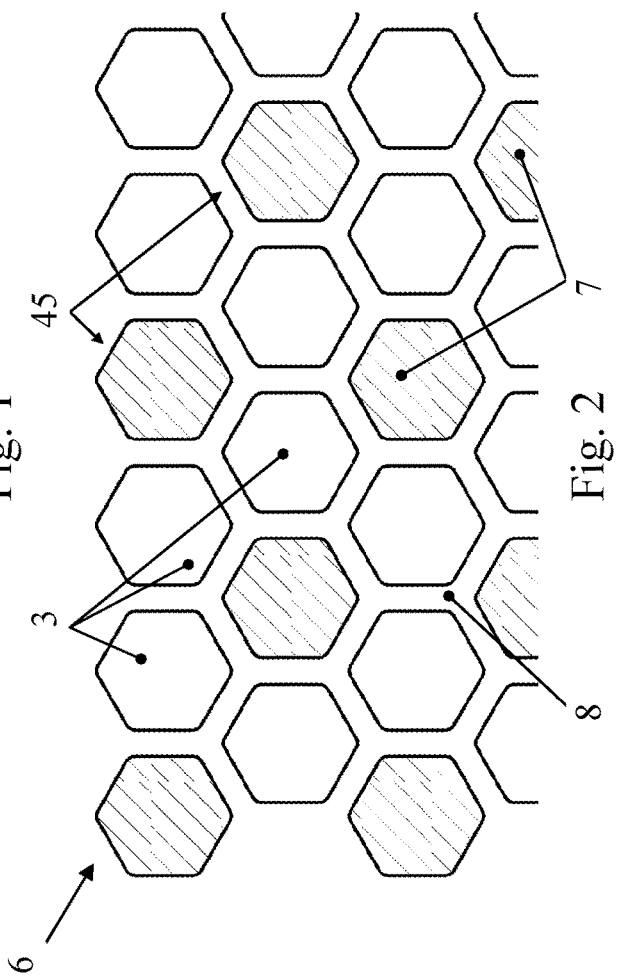
FIG. 2 shows a further embodiment of a primary transmission element in a schematic view.

FIG. 2 shows a further embodiment of a primary transmission element 6 in a schematic view. The primary transmission element 6 differs from the primary transmission element 2 according to FIG. 1 in that primary PE contact surfaces 7 are covered with a cap 45 made of ferromagnetic material. The caps 45 form the first parts of the magnetic coupling element.

Figure 3:
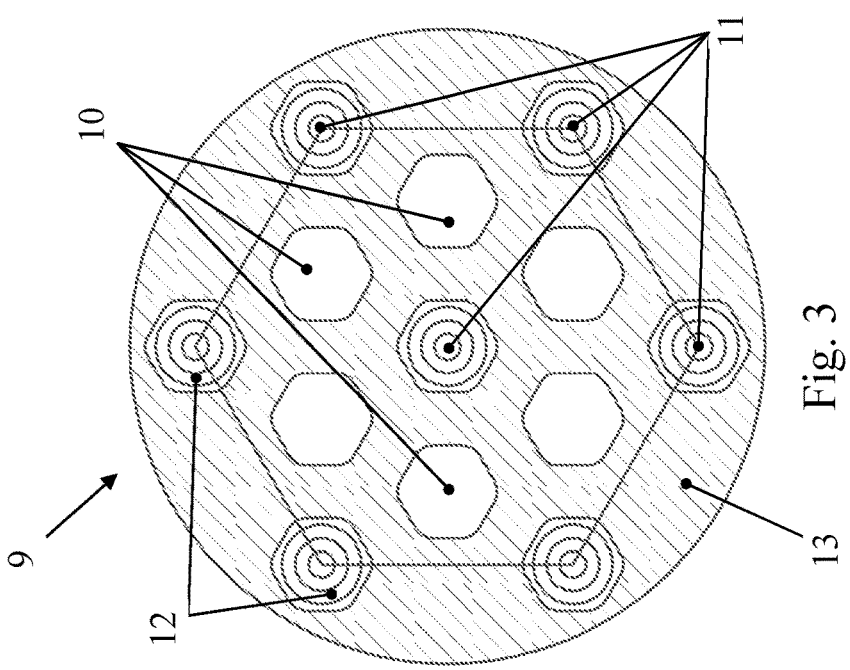
FIG. 3 shows a first embodiment of a secondary transmission element in a schematic view.

FIG. 3 shows an embodiment of a secondary transmission element 9 in a schematic view. The secondary transmission element 9 comprises several secondary contact surfaces 10 and several secondary PE contact surfaces 11. In the secondary PE contact surfaces 11, second parts of a positioning means are formed in the form of a magnetic coupling element. The second parts are formed by electromagnets 12 which can be actuated by means of a control unit 25 represented in FIG. 5. The secondary contact surfaces 10 and the secondary PE contact surfaces 11 are arranged on the secondary transmission element 9, electrically insulated from each other. In this embodiment, the secondary contact surfaces 10 and the secondary PE contact surfaces 11 are moulded into artificial resin 13.

The structure of the arrangement of the secondary contact surfaces 10 and the secondary PE contact surfaces 11 substantially corresponds to the structure of the arrangement of the primary contact surfaces 3 and the primary PE contact surfaces 4 of the primary transmission element 2 according to FIG. 1 or the structure of the arrangement of the primary contact surfaces 3 and the primary PE contact surfaces 7 of the primary transmission element 6 according to FIG. 2.

Figure 4:
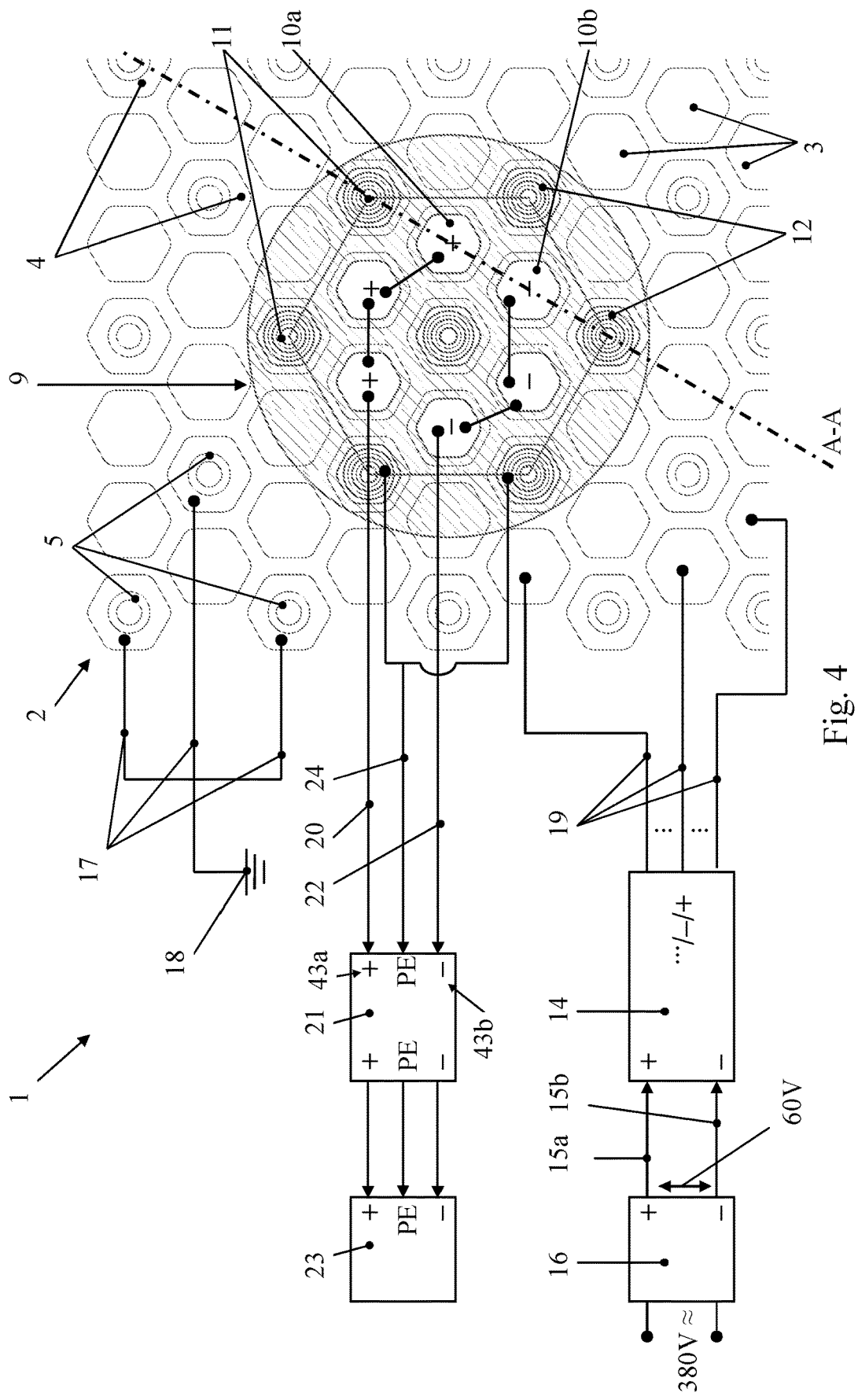
FIG. 4 shows an embodiment of the contacting system according to the invention with contacted primary transmission element according to FIG. 1 and secondary transmission element according to FIG. 3 in a schematic view.

FIG. 4 shows an embodiment of a contacting system 1 according to the invention with contacted primary transmission element 2 according to FIG. 1 and secondary transmission element 9 according to FIG. 3 in a schematic view.

Each primary contact surface 3 of the primary transmission element 2 is connected via first connecting lines 19 via a switch unit 14 to two terminals, one positive terminal 15a and one negative terminal 15b, of the primary device. For the sake of better clarity, only a few of the first connecting lines 19 are represented in FIG. 4. The primary transmission element 2 is advantageously embedded into a road surface of a parking space. The switch unit 14 has a plurality of switches, wherein each primary contact surface 3 is connected via a switch to one of the terminals 15a, 15b or is switched potential-free. The switches of the switch unit 14 are actuated by control means formed in the switch unit 14. The individual switches in the switch unit 14 are formed by common relays, and the control means are formed by a microcontroller. The primary device is formed by a power supply unit 16 in the form of a transformer and rectifier hooked up to the power grid, which transforms an alternating voltage of 380V of the power grid to 60V or more direct of voltage.

In a further embodiment, the individual switches in the switch unit 14 are formed by power thyristors or power transistors.

The primary PE contact surfaces 4 are connected to the earth potential 18 via second connecting lines 17. In this embodiment, the primary PE contact surfaces 4 are directly grounded. However, it is also possible that the primary PE contact surfaces 4 are grounded via the power grid to which the power supply unit 16 is connected. For the sake of better clarity, only a few of the second connecting lines 17 are represented in FIG. 4.

Three first secondary contact surfaces 10a of the secondary transmission element 9 are connected to the positive terminal 43a of the secondary device via a third connecting line 20. Three second secondary contact surfaces 10b of the secondary transmission element 9 are connected to a negative terminal 43b of the secondary device via a fourth connecting line 22. The secondary device is formed by a charging circuitry 21 of a vehicle with an electric drive. The secondary PE contact surfaces 11 are connected to an earth terminal of the charging circuitry 21 via a fifth connecting line 24. For the sake of better clarity, only a few of the fifth connecting lines 24 are represented in FIG. 4. A power supply of the vehicle characterized by the block 23 is connected to the charging circuitry 21. The power supply is formed, for example, by a lithium-ion battery.

In a further embodiment, the contacting system 1 has a primary transmission element 6 according to FIG. 2.

In a further embodiment, the power supply unit 16 transforms the alternating voltage of 380V to 200V direct voltage.

In a further embodiment, the primary device is formed by a fuse box with several fuses, wherein the 380V alternating voltage of the power grid is directly applied to the terminals 15a and 15b. In this embodiment, the charging circuitry 21 additionally also has a rectifier in order to transform the alternating voltage to direct voltage for the vehicle's power supply. In the case of this embodiment, the switches of the switch unit 14 are advantageously formed by power triacs.

Figure 5:
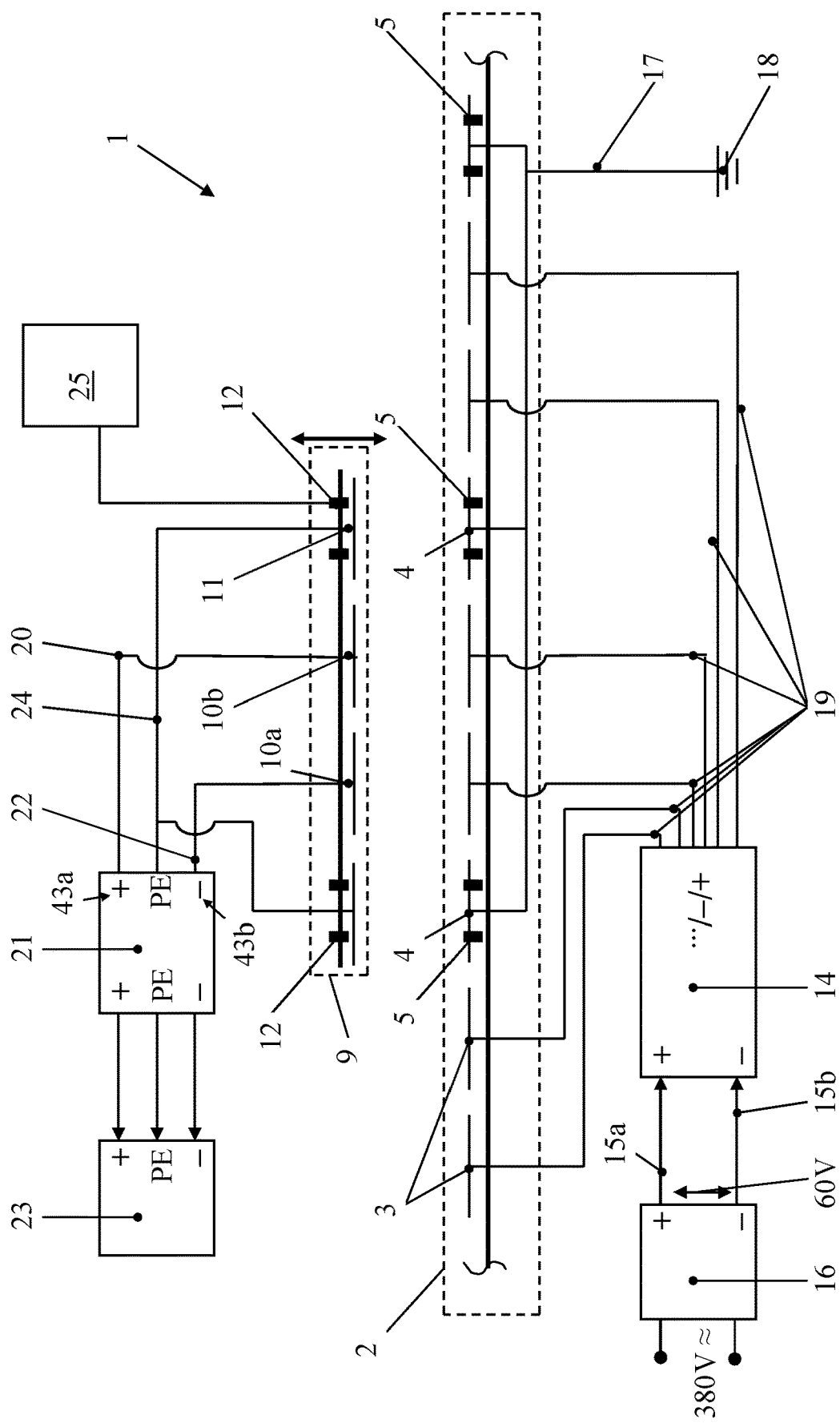
FIG. 5 shows the embodiment of the contacting system according to the invention according to FIG. 4 in a schematic view along the section A-A.

FIG. 5 shows the embodiment of the contacting system 1 according to the invention according to FIG. 4 in a sectional view along the line A-A. In the following, the creation of an electrical connection between the terminals 15a, 15b of the power supply unit 16 and the terminals 43a, 43b of the charging circuitry 21 is described in more detail. The secondary transmission element 9 is fastened to the underbody of the vehicle so that it can be lifted and lowered by means of an actively controllable lowering unit, wherein the secondary transmission element 9 is movably fastened to the lowering unit. The vehicle and the lowering unit are not represented in FIG. 5 for the sake of better clarity. A control unit 25 formed in the vehicle recognizes when the vehicle has been parked above the primary transmission element 2. If this is the case, then the control unit 25 activates the electromagnets 12, and actuates the lowering unit to lower the secondary transmission element 9 onto the primary transmission element 2. Through the activated electromagnets 12 and because of the inlays 5 formed in the primary PE contact surfaces 4, the primary transmission element 9 is aligned with the secondary transmission element 2, such that a respective secondary PE contact surface 11 extensively makes contact with a respective primary PE contact surface 4 and the PE contact surfaces 4, 11 entirely cover one another.

Through the number of the secondary PE contact surfaces 11 and the primary PE contact surfaces 4, the secondary transmission element 9 is aligned both angularly and translationally with respect to the primary transmission element 2 by the electromagnets 12, with the result that in each case one of the six secondary contact surfaces 10a, 10b in each case makes contact with a primary contact surface 3. As each secondary contact surface 10a, 10b rests entirely on a primary contact surface 3, the advantage is obtained that very high powers can be transmitted via the contact surfaces. Via the primary PE contact surfaces 4 and the secondary PE contact surfaces 11 the charging circuitry 21 is grounded switch-free.

The microcontroller formed in the switch unit 14 determines those primary contact surfaces 3 which make contact with a secondary contact surface. The primary contact surfaces 3 are still all switched potential-free at this point in time. In the further step, the microcontroller determines which primary contact surfaces 3 are connected to which terminal 43a, 43b of the charging circuitry 21 via the secondary contact surfaces 10a, 10b. After determining the polarity of the primary contact surfaces 3, by actuating the switch unit 14, the microcontroller establishes an electrical connection via determined first primary contact surfaces 3 and the first secondary contact surfaces 10a between the positive terminal 43a of the charging circuitry and the positive terminal 15a of the power supply unit 16, and establishes an electrical connection via determined second primary contact surfaces 3 and the second secondary contact surfaces 10b between the negative terminal 43b of the charging circuitry 21 and the negative terminal 15b of the power supply unit 16. As a result, an electrical connection is established between the terminals 15a, 15b of the power supply unit 16 and the terminals 43a, 43b of the charging circuitry 21. The remaining primary contact surfaces 3, which do not make contact with any secondary contact surface 10a, 10b, remain potential-free.

When the charging process is completed or if the driver of the vehicle wishes to drive away, the control unit 25 actuates the lowering unit to deactivate the electromagnets 12 and to lift the secondary transmission element 9. Before the secondary transmission element 9 is lifted off the primary transmission element 2, the microcontroller interrupts the current supply to the primary contact surfaces 3, and all the primary contact surfaces 3 are switched potential-free again.

In a further embodiment, the electrical connection between the first secondary contact surfaces 10a and the positive terminal 43a of the charging circuitry 21 is interrupted and the electrical connection between the second secondary contact surfaces 10b and the negative terminal 43b of the charging circuitry 21 is interrupted before the lowering unit is raised. Only when primary transmission element 2 and secondary transmission element 9 are in contact, the electrical connection between the charging circuitry and the secondary contact surfaces 10a, 10b is re-established. An electrification at the terminals of the secondary contact surfaces 10a, 10b is hereby avoided and it is avoided that the terminals 43a, 43b of the charging circuitry 21 are short-circuited while driving or during contacting.

In a further embodiment, the primary contact surfaces 3 of the primary transmission element 2 are connected alternatingly via the first connecting lines 19, via the switch unit 14 to the positive terminal 15a and the negative terminal 15b of the power supply unit 16. In section A-A, one of the two primary contact surfaces 3 lying between two primary PE contact surfaces 4 is thus connected only to the positive terminal 15a of the power supply unit 16 via a switch, and the other of the two primary contact surfaces 3 lying between two primary PE contact surfaces 4 is connected only to the negative terminal 15b of the power supply unit 16 via a switch. Furthermore, the secondary contact surface 10a or 10b must be at least so large that the secondary contact surface 10a or 10b or several secondary contact surfaces 10a or 10b of the same polarity covers/cover at least two primary contact surfaces 3 when primary transmission element 2 and secondary transmission element 9 are contacted. The advantage is hereby obtained that not all the primary contact surfaces 3 which are making contact with a secondary contact surface 4 have to be switched in order to establish a connection between the positive terminal 15a of the power supply unit 16 and the positive terminal 43a of the charging circuitry 21, and the negative terminal 15b of the power supply unit 16 and the negative terminal 43b of the charging circuitry 21.

Figure 6:
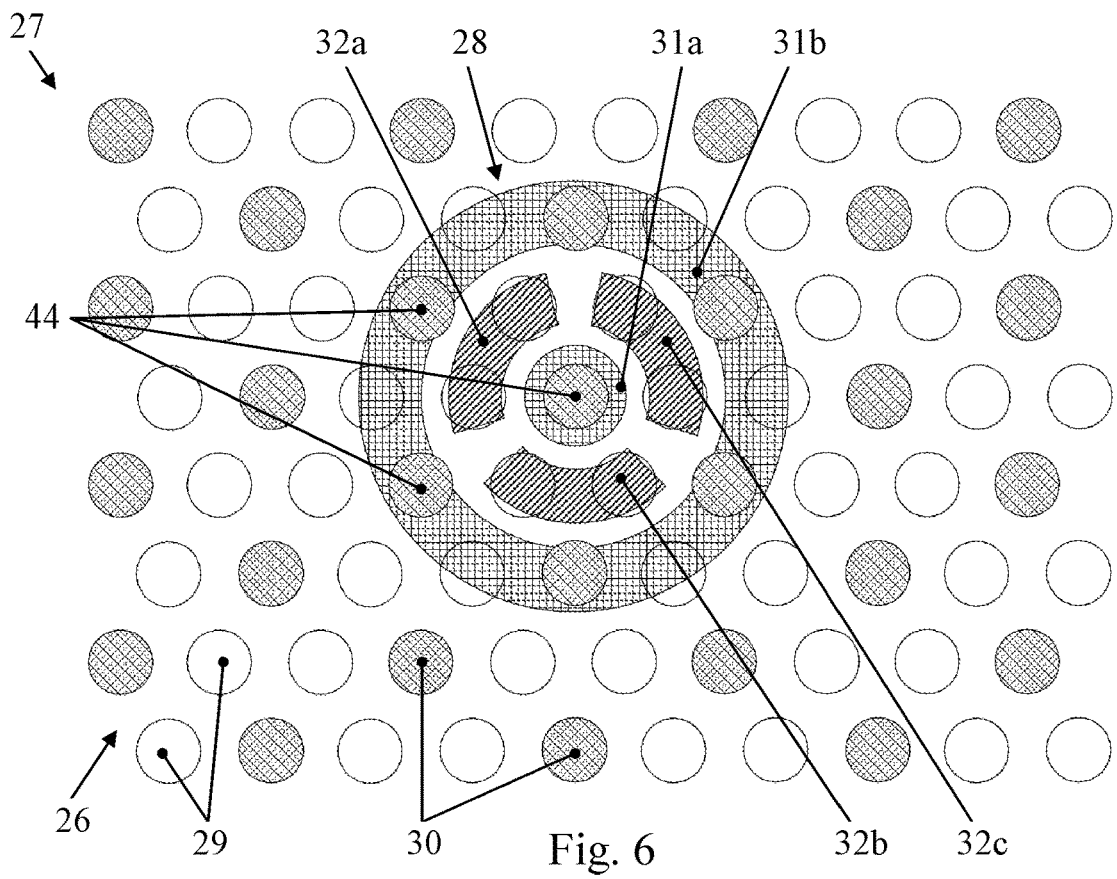
FIG. 6 shows a further embodiment of a contacting system according to the invention with contacted primary transmission element and secondary transmission element in a schematic view.

FIG. 6 shows a further embodiment of a contacting system 26 according to the invention with contacted primary transmission element 27 and secondary transmission element 28 in a schematic view. Unlike the primary transmission element 6 according to FIG. 2, in the case of the primary transmission element 27, primary contact surfaces 29 and primary PE contact surfaces 30 are formed round. The primary PE contact surfaces 30 are also covered with a ferromagnetic cap. In each case, the caps form a first part of a positioning means formed by a magnetic coupling element.

In a further embodiment, the primary PE contact surfaces 30 consist entirely of a ferromagnetic material.

The secondary transmission element 28 has two secondary PE contact surfaces and three secondary contact surfaces, wherein a first secondary PE contact surface 31a is round and a second secondary PE contact surface 31b is ring-shaped. The advantage is hereby obtained that, when first transmission element 27 and second transmission element 28 are contacted, the secondary contact surfaces are completely enclosed by the second secondary PE contact surface 31b and are thus not accessible from outside. The secondary contact surfaces are connected to the secondary device with three different terminals, wherein a first secondary contact surface 32a is connected to a negative terminal of the secondary device, a second secondary contact surface 32b is connected to a positive terminal of the secondary device and a third secondary contact surface 32c is connected to an INPUT/OUTPUT terminal of the secondary device for data exchange. The primary device comprises a positive terminal, a negative terminal and an INPUT/OUTPUT terminal, wherein the individual terminals are connected to the primary contact surfaces 29 via switches in each case. As a result, the contacting system 26 can also be used to exchange data between primary and secondary devices. For the sake of clarity, the representation of electronics and the representation of the primary device and of the secondary device have been dispensed with in FIG. 6. The electronics are, however, substantially identical to the electronics shown in FIG. 4 or FIG. 5.

In the case of the embodiment represented in FIG. 6, in the first secondary PE contact surface 31a, a second part of the magnetic coupling element is formed in the form of an electromagnet 44, and in the second secondary PE contact surface 31b, six second parts are formed in the form of electromagnets 44. The electromagnets 44 are formed in the secondary PE contact surfaces 31a, 31b, such that they are concealed under the surface of the secondary PE contact surfaces 31a and 31b and are invisible from outside. The electromagnets 44 which are formed in the second secondary PE contact surface 31b are arranged in the second secondary PE contact surface 31b such that, when primary transmission element 27 and secondary transmission element 28 are contacted, each secondary contact surface 31a, 31b and 31c covers two primary contact surfaces 29. During contacting of the secondary transmission element 28 with the primary transmission element 27, the secondary transmission element 28 is thus always aligned both angularly and translationally with respect to the primary transmission element 27.

In a further embodiment, the primary device comprises three terminals to which a three-phase current is applied, wherein the individual terminals are connected to the primary contact surfaces 29 via switches in each case. In the case of this embodiment, the first secondary contact surface 32a is assigned to a first terminal of the secondary device for current transmission, the second secondary contact surface 32b is assigned to a second terminal of the secondary device for current transmission and the third secondary contact surface 32c is assigned to a third terminal of the secondary device for current transmission. As a result, in the case of this arrangement, three-phase alternating current can be transmitted from the primary to the secondary device via the contacting system. This is particularly advantageous as the alternating current of a power grid supply may thus be transmitted directly.

Figure 7:
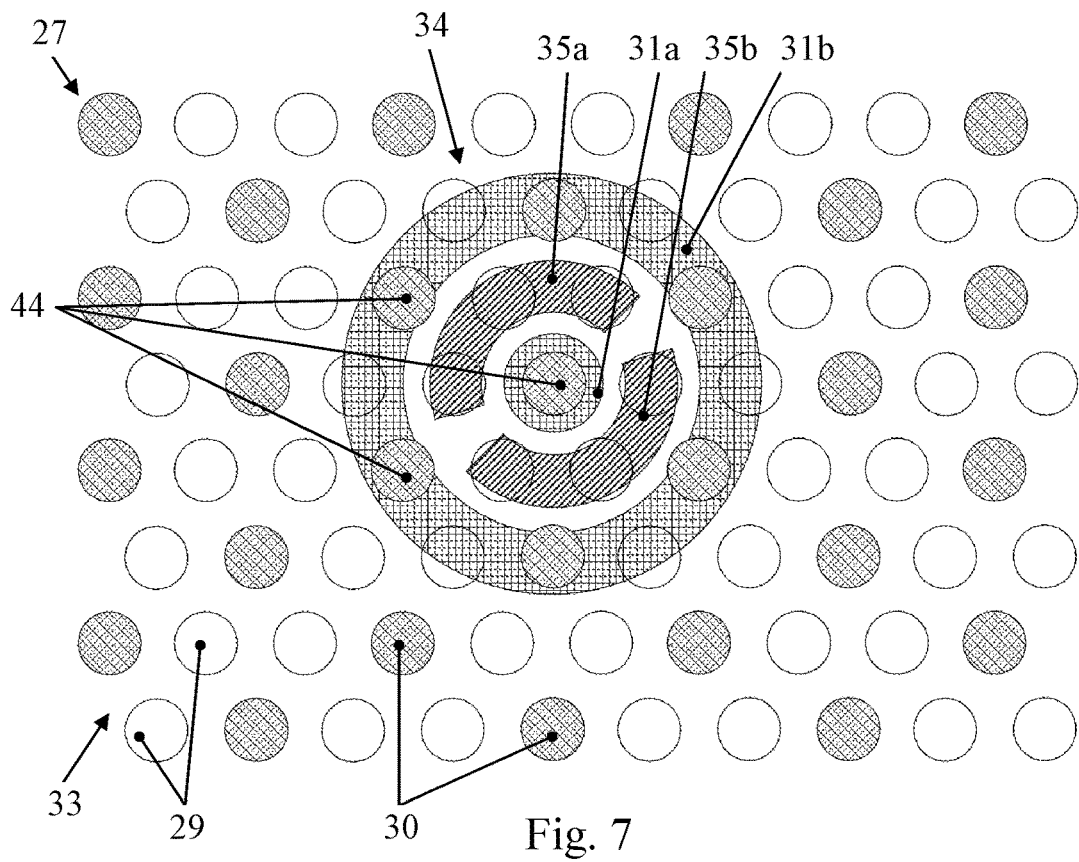
FIG. 7 shows a further embodiment of a contacting system according to the invention with contacted primary transmission element and secondary transmission element in a schematic view.

FIG. 7 shows a further embodiment of a contacting system 33 according to the invention with contacted primary transmission element 27 and secondary transmission element 34 in a schematic view. The secondary transmission element 34 differs from the secondary transmission element 28 of the contacting system 26 according to FIG. 6 in that the secondary transmission element 34 has only two secondary contact surfaces 35a, 35b. When primary transmission element 27 and secondary transmission element 34 are contacted, each secondary contact surface 35a, 35b covers three primary contact surfaces 29. The advantage is hereby obtained that a higher power can be transmitted via the primary transmission element 27 and the secondary transmission element 34. For the sake of clarity, the representation of electronics has been dispensed with in FIG. 7. The electronics are, however, substantially identical to the electronics shown in FIG. 4 or FIG. 5.

Figure 8:
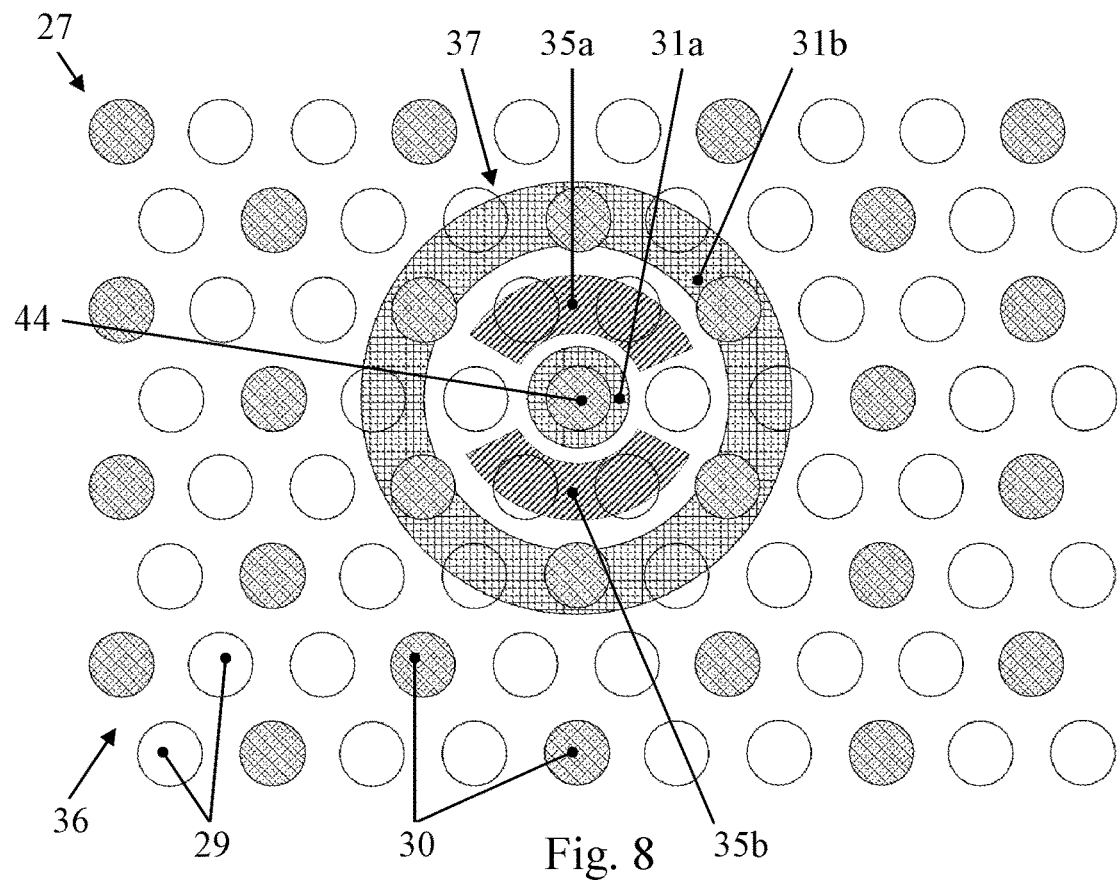
FIG. 8 shows a further embodiment of a contacting system according to the invention with contacted primary transmission element and secondary transmission element in a schematic view.

FIG. 8 shows a further embodiment of a contacting system 36 according to the invention with contacted primary transmission element 27 and secondary transmission element 37 in a schematic view. The secondary transmission element 37 differs from the secondary transmission element 34 of the contacting system 33 according to FIG. 7 in that the secondary contact surfaces 35a and 35b are spaced apart from each other such that, when primary transmission element 27 and secondary transmission element 37 are contacted, and in the case of contact between the first secondary PE contact surface 31a and a primary PE contact surface 30, an angular alignment of the secondary transmission element 37 with respect to the primary transmission element 27 can be avoided. The advantage is hereby obtained that electromagnets can be dispensed with in the second secondary PE contact surface 31b, whereby the manufacturing effort is reduced during the production of the secondary transmission element 37.

Figure 9:
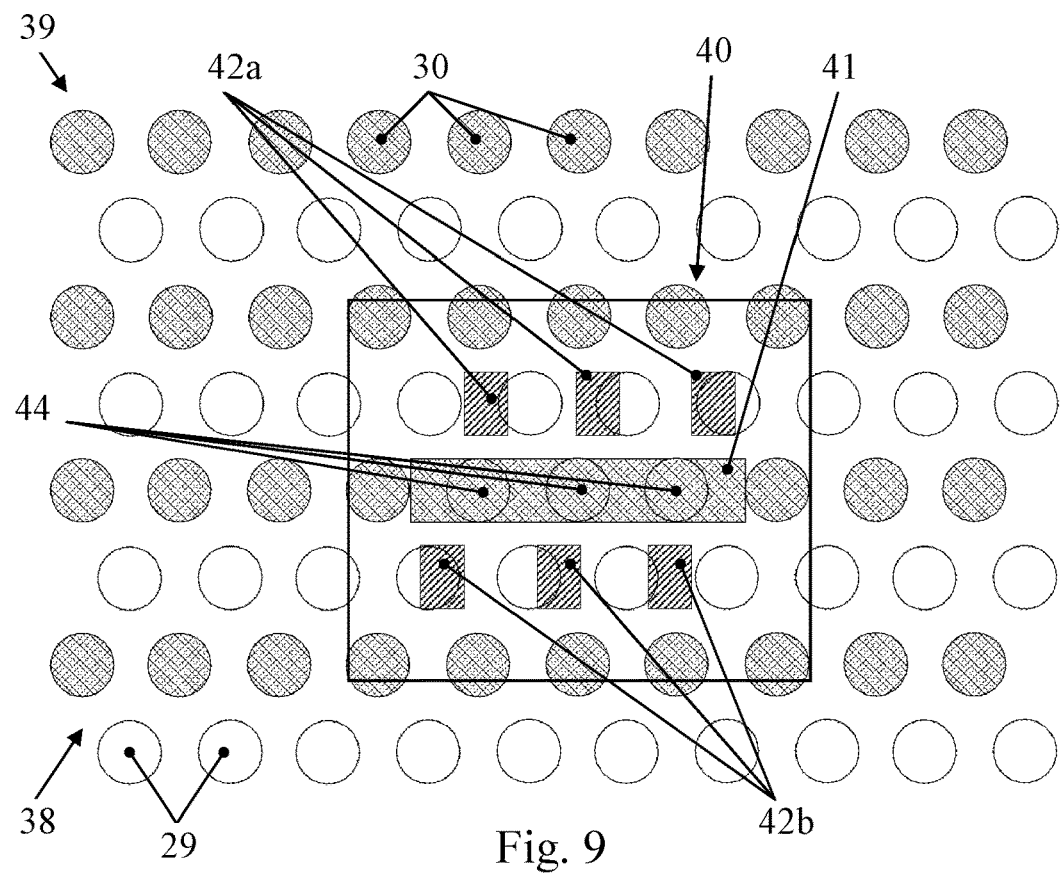
FIG. 9 shows a further embodiment of a contacting system according to the invention with contacted primary transmission element and secondary transmission element in a schematic view.

FIG. 9 shows a further embodiment of a contacting system 38 according to the invention with contacted primary transmission element 39 and secondary transmission element 40 in a schematic view. The primary transmission element 39 differs from the primary transmission element 27 of the contacting system 36 according to FIG. 8 in that the primary contact surfaces 29 and the primary PE contact surfaces 30 are arranged alternatingly in rows in a structured manner on the primary transmission element 39. The secondary transmission element 40 is formed substantially rectangular, and has a secondary PE contact surface 41, three first secondary contact surfaces 42a and three second secondary contact surfaces 42b, wherein the first secondary contact surfaces 42a are connected to a first terminal of a secondary device and the second secondary contact surfaces 42b are connected to a second terminal of the secondary device. For the sake of clarity, the secondary device is not represented in FIG. 9. In the secondary PE contact surface 42, second parts of a positioning means are formed by a magnetic coupling element. The second parts are formed by electromagnets 44. During contacting of the primary transmission element 39 and of the secondary transmission element 40, the secondary transmission element 40 is aligned both translationally and angularly with respect to the primary transmission element 39 by the electromagnets 44.

It may be mentioned that direct voltages of 80, 100 or 400 volts, as well as alternating voltages in similar voltage ranges may also be made available by the primary device. Furthermore, the number of the terminals in the embodiment examples is not to be regarded as limiting. It is possible, for example, to transmit three-phase alternating current with a neutral conductor. In addition, further alternating voltages with different voltage amplitude or frequency could be transmitted via further secondary contact surfaces and terminals. Likewise, the transmission of data with respect to, for example, the charge state of the vehicle, would be possible via further secondary contact surfaces and terminals. The primary transmission means could also be provided on the vehicle, and the secondary transmission means could be provided in the road surface of a parking space.

In a further embodiment, a current transmission is effected from the secondary to the primary device via the contacting system.

A car, a lorry, a motorbike, a bus, a shuttle or a drone are meant by the term "vehicle" above all.

The invention claimed is:

1. A contacting system for establishing an electrical connection between a primary device and a secondary device with at least two terminals electrically insulated from each other, with:
   a primary transmission element which has a plurality of primary contact surfaces arranged in a structured manner, electrically insulated from each other, wherein each primary contact surface is connected to at least one terminal of the primary device via a respective switch, and with
   a secondary transmission element which has a plurality of secondary contact surfaces electrically insulated from each other, wherein each terminal of the secondary device is electrically connected to at least one secondary contact surface, wherein the primary transmission element is formed for contacting with the secondary transmission element and wherein, when the primary transmission element and the secondary transmission element are contacted, the secondary contact surfaces are in contact with at least a part of the primary contact surfaces, and with control means which, when the primary transmission element and the secondary transmission element are contacted, are designed to determine primary contact surfaces which are in contact with a secondary contact surface, and which are designed to establish an electrical connection between the individual terminals of the primary device and the individual terminals of the secondary device via the determined primary contact surfaces and the secondary contact surfaces by actuating the switches,
   characterized in that on the primary transmission element, several primary PE contact surfaces are formed, which are arranged on the primary transmission element between the primary contact surfaces in a structured manner electrically insulated from the primary contact surfaces, in that on the secondary transmission element, at least one secondary PE contact surface is formed, which is electrically insulated from the secondary contact surfaces, and in that the contacting system has positioning means, which positioning means, during contacting of the primary transmission element with the secondary transmission element, align the secondary transmission element and the primary transmission element with respect to each other, such that the at least one secondary PE contact is in contact with at least one primary PE contact surface.

2. The contacting system according to claim 1, characterized in that, when the primary transmission element and the secondary transmission element are contacted, a switch-free connection is established between the primary device and the secondary device via at least one primary PE contact surface and the at least one secondary PE contact surface.

3. The contacting system according to claim 2, characterized in that the primary PE contact surfaces are permanently connected to the earth potential or in that the at least one secondary PE contact surface is permanently connected to the earth potential.

4. The contacting system according to claim 1, characterized in that the positioning means are formed by a magnetic coupling element, which magnetic coupling element has at least one first part and at least one second part, wherein the at least one first part is formed in the primary transmission element and the at least one second part is formed in the secondary transmission element.

5. The contacting system according to claim 4, characterized in that the at least one first part of the magnetic coupling element is formed by an electromagnet or permanent magnet and the at least one second part is formed by a ferromagnetic element, an electromagnet or a permanent magnet.

6. The contacting system according to claim 4, characterized in that a first part of the at least one magnetic coupling element is formed in each primary PE contact surface, and in that a second part is formed in the at least one secondary PE contact surface.

7. The contacting system according to claim 4, characterized in that the at least one first part of the magnetic coupling element is formed by a ferromagnetic element and the at least one second part is formed by an electromagnet or a permanent magnet.

8. The contacting system according to claim 1, characterized in that the primary transmission element has a primary surface and in that the secondary transmission element has a secondary surface, wherein the positioning means are formed by a first spatial structure of the primary surface and a second spatial structure of the secondary surface.

9. The contacting system according to claim 8, characterized in that the first spatial structure of the primary surface represents a negative form of the spatial structure of the secondary surface.

10. The contacting system according to claim 1, characterized in that the positioning means are formed by a displacement unit, which displacement unit acts on the primary and/or the secondary transmission element and is formed for contacting the primary transmission element with the secondary transmission element, and formed by at least one sensor, which at least one sensor is formed in the secondary transmission element and/or the primary transmission element wherein, during contacting of the primary transmission element with the secondary transmission element, the at least one sensor detects a relative position between primary transmission element and secondary transmission element and wherein the displacement unit is actuatable in accordance with the detected relative position such that the at least one secondary PE contact surface makes contact with at least one primary PE contact surface.

11. The contacting system according to claim 1, characterized in that the primary transmission element is formed in a road surface of a parking space, an intersection area or a garage and in that the primary device is formed by a power supply unit.

12. The contacting system according to claim 1, characterized in that the secondary transmission element is formed to be lowered and lifted on a vehicle, in particular a vehicle with an electric drive, and in that the secondary device is formed by a charging circuitry of the vehicle.

13. The contacting system according to claim 1, characterized in that the primary PE contact surfaces and the at least one secondary PE contact surface are formed round or polygonal, wherein the positioning means, during contacting of the primary transmission element and of the secondary transmission element, align the secondary transmission element and the primary transmission element with respect to each other, such that the at least one secondary PE contact surface entirely covers at least one primary PE contact surface.

14. The contacting system according to claim 13, characterized in that the primary contact surfaces of the primary transmission element are arranged opposite the secondary contact surfaces of the secondary transmission element such that, when the at least one secondary PE contact surface is in contact with at least one primary PE contact surface, each secondary contact surface entirely covers at least one primary contact surface.

15. The contacting system according to claim 1, characterized in that the positioning means, during contacting of the primary transmission element with the secondary transmission element, align the secondary transmission element angularly and/or translationally with respect to the primary transmission element.

16. The contacting system according to claim 1, characterized in that the at least one secondary PE contact surface is arranged on the secondary transmission element surrounding the secondary contact surfaces, wherein the at least one secondary PE contact surface is formed in particular ring-shaped.

17. The contacting system according to claim 1, characterized in that an alternating voltage is applied to the at least two terminals of the primary device and/or to the at least two terminals of the secondary device.

18. The contacting system according to claim 1, characterized in that at least one terminal of the secondary device and one terminal of the primary device are formed to exchange data between primary device and secondary device.

* * * * *